H. E. ELLIS.
AQUATIC PLANT HARVESTER.
APPLICATION FILED DEC. 16, 1919.
1,344,626.
Patented June 29, 1920.
6 SHEETS—SHEET 3.
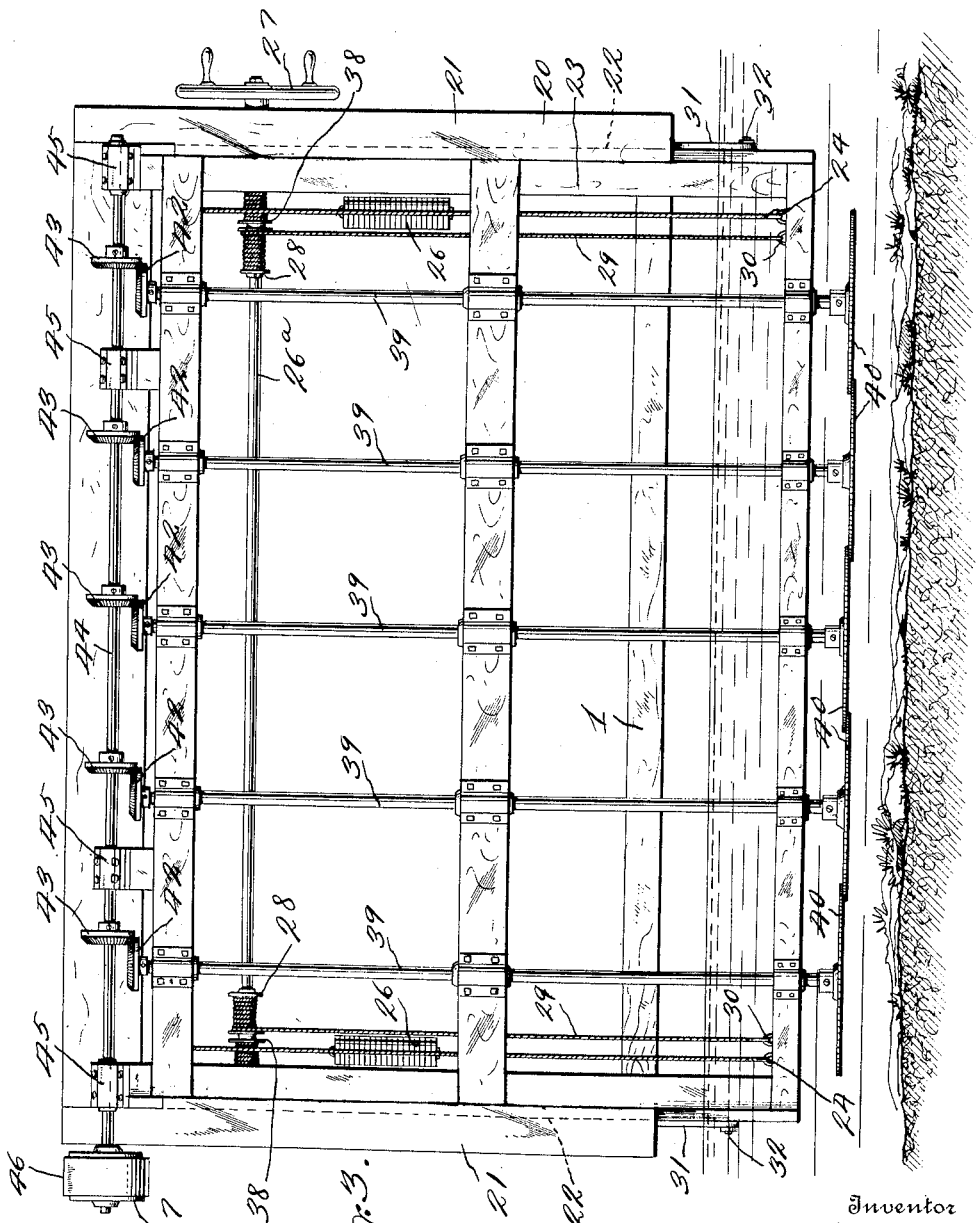
Inventor
H. E. Ellis
By D. Swift
Attorney H. E. ELLIS.
AQUATIC PLANT HARVESTER.
APPLICATION FILED DEC. 16, 1919.
1,344,626.
Patented June 29, 1920.
6 SHEETS—SHEET 4.
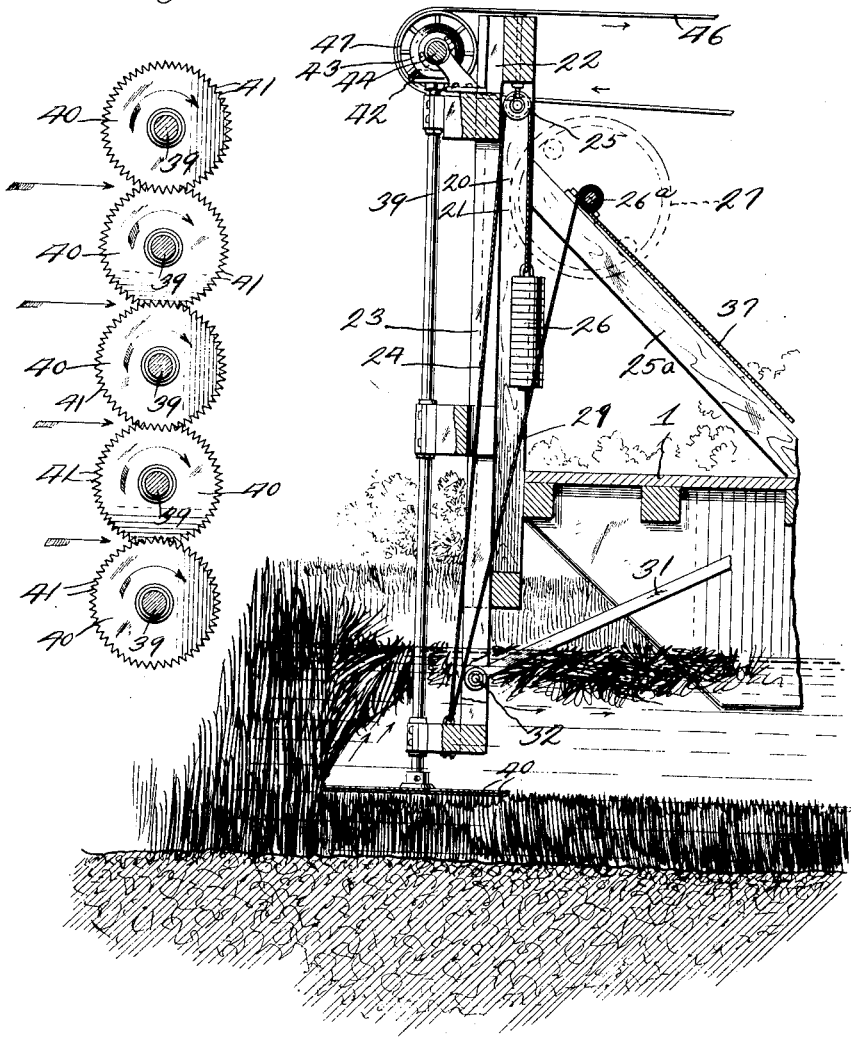
Inventor
H. E. Ellis
By O. Swift
Attorney

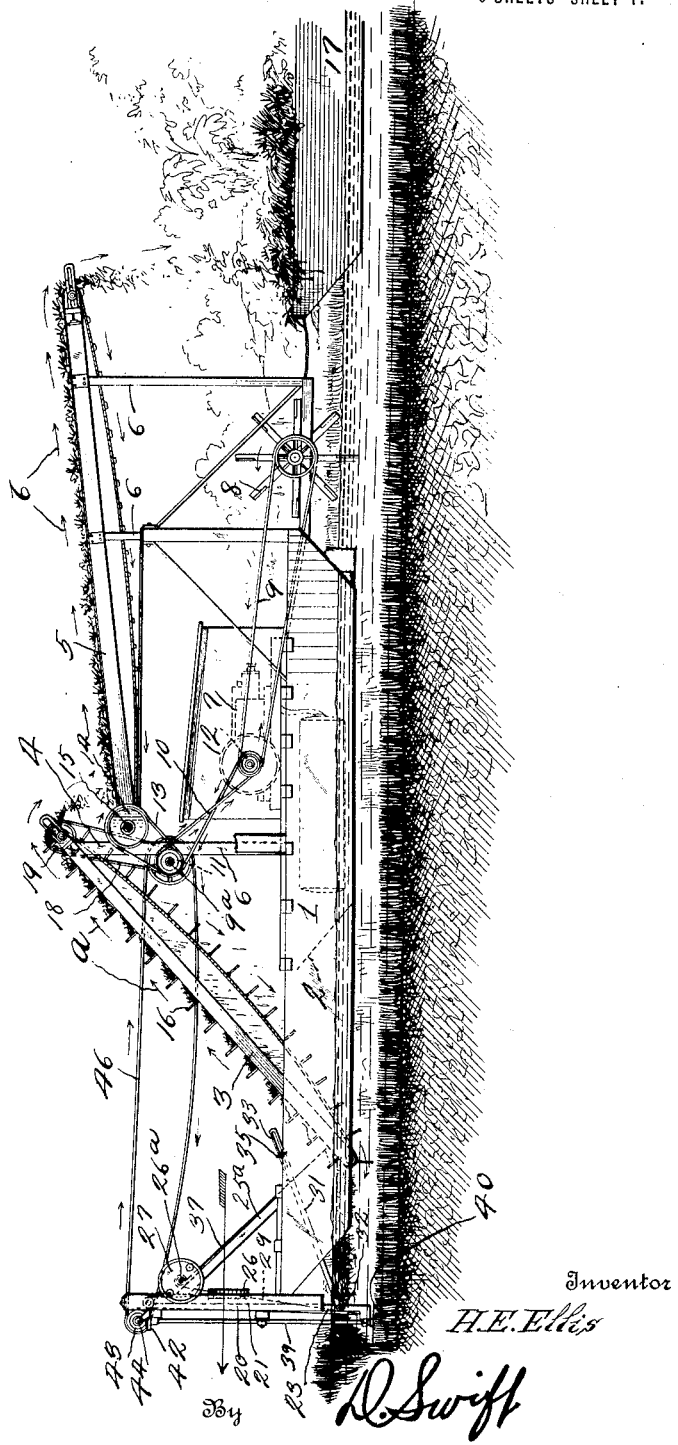

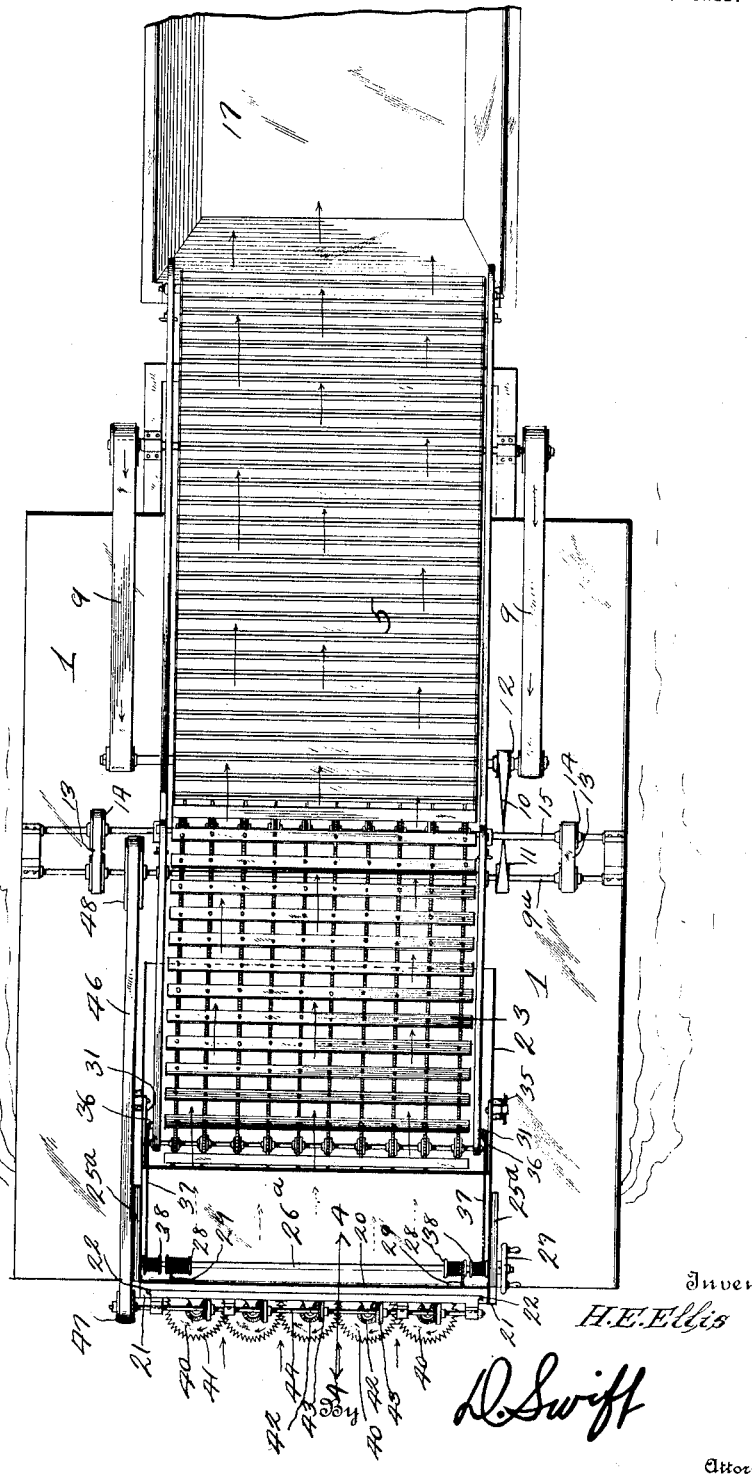

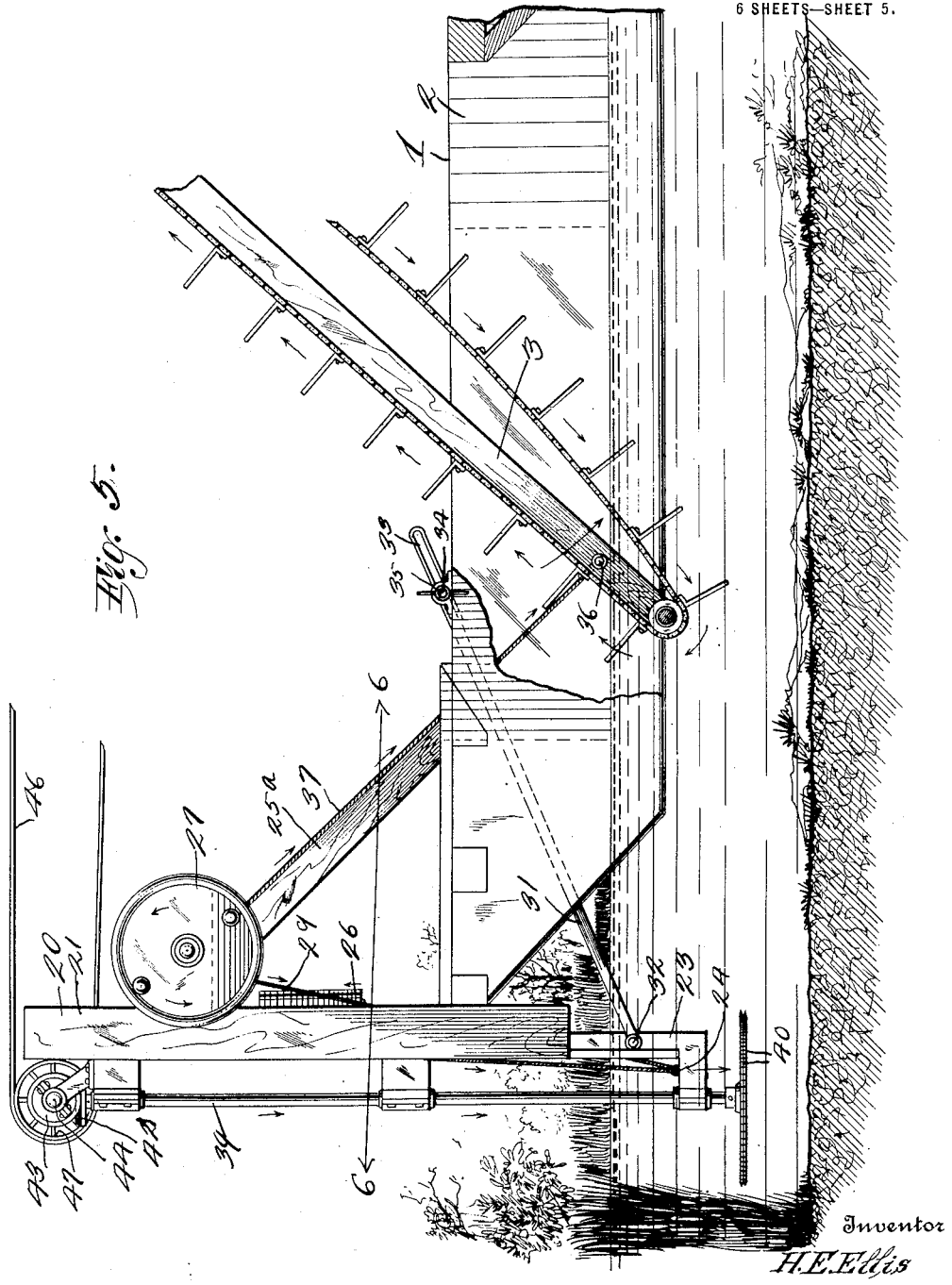

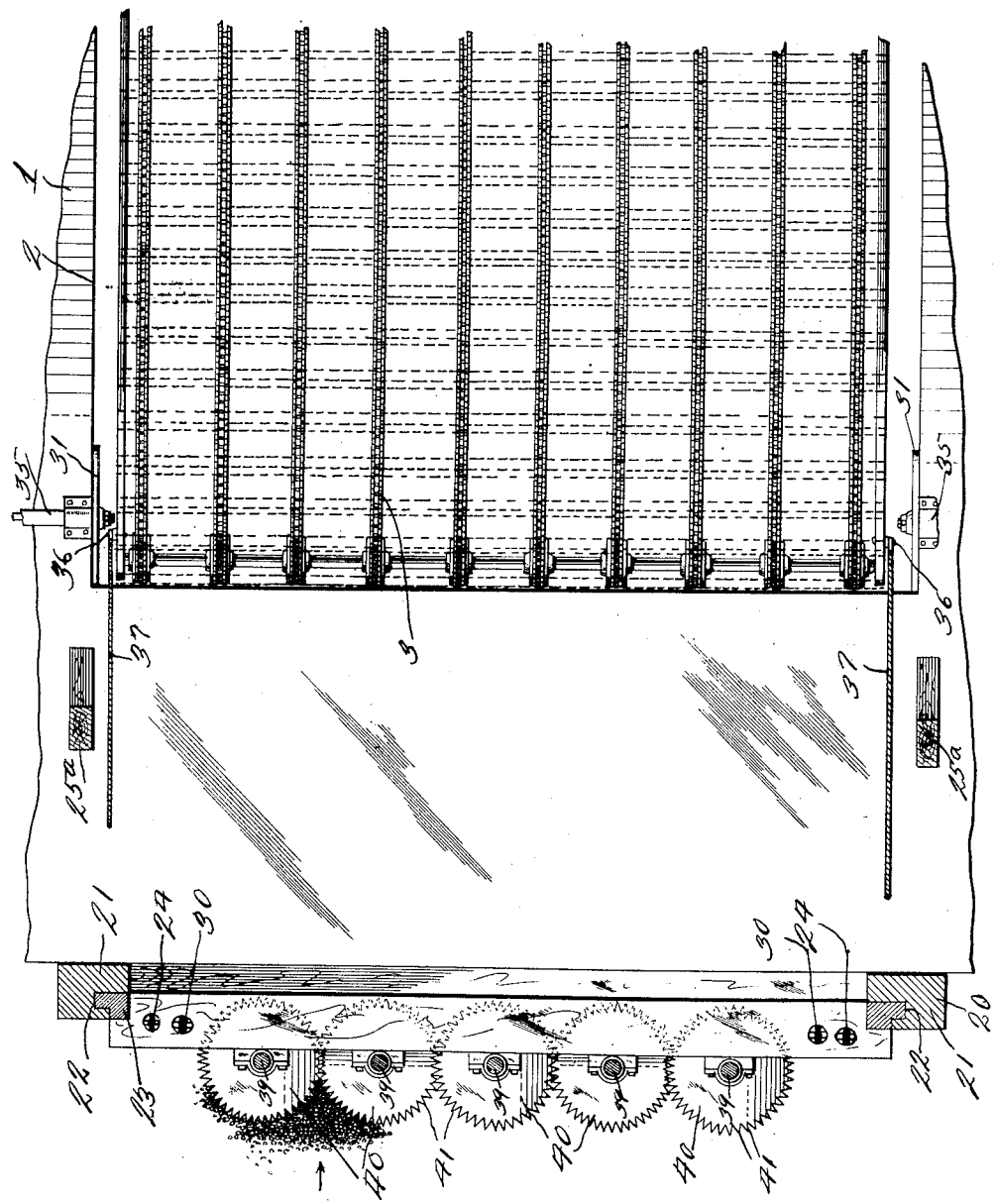

UNITED STATES PATENT OFFICE.

HARRY ELLWOOD ELLIS, OF LEESBURG, FLORIDA.

AQUATIC-PLANT HARVESTER.

1,344,626.  Specification of Letters Patent.  Patented June 29, 1920.

Application filed December 16, 1919. Serial No. 345,422.

*To all whom it may concern:*

Be it known that I, HARRY E. ELLIS, a citizen of the United States, residing at Leesburg, in the county of Lake, State of Florida, have invented a new and useful Aquatic-Plant Harvester; and I do hereby declare the following to be a full, clear, and exact description of the invention, such as will enable others skilled in the art to which it appertains to make and use the same.

The invention relates to aquatic plant harvesters and has for its object to provide a harvester of this character, which is particularly adapted for harvesting aquatic plants which are found in the lakes and rivers of the southern parts of the United States, where they grow in large quantities and are utilized for various purposes in the arts and manufactures. The harvester being so constructed that the plants will be severed below the surface of the water, then rising to the surface of the water after which they are gathered by an inclined conveyer which deposits the plants on a horizontal conveyer which conveyer in turn deposits or discharges the plants on a barge, which barge is towed behind the harvesting machine.

A further object is to provide a plant harvester comprising a barge, the forward end of said barge having a slidable frame in which rotatable cutters are mounted, means whereby said frame may be adjusted and held at various positions, also to provide a pivoted gathering conveyer having its lower end disposed in the water to the rear of the cutters and connected to the cutter frame in such a manner that as the cutter frame is lowered the free end of the gathering conveyer will also be lowered according to the depth of the cutter frame.

A further object is to provide counter weight means for the vertically slidable cutter frame whereby said frame may be easily positioned vertically and after being so positioned may be held in position by links. Also to provide power for propelling the harvester, said power forming means for operating the conveyers and the rotatable cutters.

A further object is to so space a free end of the inclined pivoted conveyer to the rear of the rotatable cutters that the aquatic plants as they are cut by the rotatable cutters will rise by their own buoyancy to the surface of the water and be gathered by the inclined conveyer and carried rearwardly over the machine and deposited into a barge, which barge is preferably towed by the harvester. Also to so space the inclined conveyer from the rotatable cutters so that as the harvester is propelled forwardly by its propelling means, the space between the cutters and the conveyer will be of a distance sufficient to allow the plants to rise to the surface of the water and be gathered by the gathering conveyer.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1 is a side elevation of the harvester showing the parts in the position they assume while in use.

Fig. 2 is a top elevation of the machine.

Fig. 3 is a front elevation of the slidable cutter frame and its guides.

Fig. 4 is a sectional view taken on line 4—4 of Fig. 2.

Fig. 5 is an enlarged detail view of the forward end of the harvester.

Fig. 6 is a horizontal sectional view taken on line 6—6 of Fig. 5.

Fig. 7 is a detail view showing the overlapped cutting elements.

Referring to the drawings, the numeral 1 designates a barge, which may be of any conventional form and 2 a cutaway portion near its forward end, which cutaway portion allows the lower end of a conveyer 3 to be disposed in the water. Conveyer 3 is pivoted at its upper end in bearings of a frame 4 and is adapted to deposit material on a rearwardly extending conveyer 5 which is supported on uprights 6. Mounted on the barge is a conventional form of engine 7 which is preferably an internal combustion engine. The engine 7 is belted to a paddle wheel by means of belts 9 which paddle wheel forms means for moving the barge 1 from place to place and also for moving the barge during a harvesting operation. Rotatably mounted in bearings carried by the centrally disposed upright 6 is a shaft 9ª, said shaft being rotated by a belt 10 which extends around a pulley 11 carried by said shaft and a pulley 12 carried by the shaft of the engine 7. The conveyer 5 is belted to the shaft 9ª by means of a belt 13, which belt extends around a pulley on the shaft 9ª and a pulley 14 carried by the shaft 15 of one of the rollers of the conveyer. The conveyer 3 is of a conventional form having fingers 16 adapted to gather the material from the surface of the water and convey the same upward and deposit it on the conveyer 5, which conveyer 5 carries the material rearwardly and dumps the same on a barge 17 which is towed by the barge 1. Power is imparted to the conveyer 3 by means of a belt 18, which belt extends around a pulley on the shaft 9ª and a pulley 19 on the shaft of the upper roller of the conveyer 3. The lower end of the conveyer 3 is free to move upwardly and downwardly on its upper pivotal point so as to adjust the lower end in relation to the surface of the water so that the material as it is cut will be gathered on the conveyer 3 as the barge 1 is propelled forwardly by its paddle wheel 8. Secured to the forward edge of the barge 1 and in any suitable manner is a frame 20, the side uprights 21 of said frame being provided with vertically disposed guide slots 22, in which guide slots a vertically slidable rectangular shaped frame 23 is mounted. Frame 23 has secured thereto as at 24 cables, which cables extend upwardly over pulleys 25 carried by the horizontal rail of the frame 21, said pulleys being provided with counter-weights 26, which are so regulated as to weight as to allow the frame 23 to be easily moved upwardly and downwardly. Rotatably mounted in bearings carried by braces 25ª which brace the frame 20 is a shaft 26ª, said shaft 26ª being provided at one of its ends with a hand wheel 27, by means of which the shaft may be rotated. Secured to the shaft 26 are drums 28 around which drums cables 29 are wound. The lower ends of the cables 29 being secured as at 30 to the lower end of the slidable frame 23. It will be seen that by rotating the wheel 27 that the counter weighted frame 23 may be moved upwardly and downwardly as desired, also that the frame 23 may be easily moved by one man. After the frame 23 is moved to the position desired, said frame is held in position by rearwardly extending links 31, which links are pivoted as at 32 to the lower sides of the frame 23 and have their other ends provided with slots 33, which slots have passing through the same bolts 34, there being nuts 35 threaded on the bolts 34 so that the slotted ends of the pivoted links 31 may be securely clamped and held by the bolts 34. Secured to the conveyer 3 as at 36 are cables 37, which cables pass upwardly and forwardly and are wound around drums 38 carried by the shaft 26ª, said cables 37 passing around the drums 38 in such a manner that as the shaft 36 is rotated for lowering the counter weighted frame 23, the cable 37 will be unwound so as to simultaneously lower the forward or free end of the conveyer 3. Rotatably mounted in vertically alined bearings carried by a slidable frame 23 are cutter shafts 39, the lower ends of said shafts being provided with a series of cutter disks 40, which disks overlap each other as clearly shown in Fig. 7 and are provided with cutting teeth 41 adapted to cut the plants and allow the plants to come to the top of the water so as to be picked up by the conveyer 3. Secured to the upper ends of the shaft 39 are bevel gears 42, which bevel gears mesh with bevel gears 43 carried by a shaft 44 which is transversely disposed and rotatably mounted in bearings 45, carried by the slidable frame 23. It will be seen that as the shaft 44 rotates that bevel gears 43 and 42 will rotate the vertically disposed shaft 39 and consequently rotate the cutting disk 40. Power is transmitted to the shaft 44 by means of a belt 46 which belt passes over a pulley 47 carried by the shaft 44 and a pulley 48 carried by the shaft 9ª. By referring to Fig. 1, it will be seen that belt 46 is provided with sufficient slack so as to allow the upward and downward adjustment of the counterweighted frame 23.

It will be seen that the cutter disk 40 and the slidable frame which carries the same are located at a distance forwardly of the lower end of the conveyer 3, thereby allowing the cut material time to rise to the top of the water by its own buoyancy so that the conveyer 3 will gather the material so conducted to the surface. Conveyer 3 moves in the direction of the arrows a and deposits the severed material on the rearwardly extending conveyer 5, which conveyer 5 moves in the direction of the arrows b and deposits the materials in a barge 17 which is preferably towed behind the barge 1. During a cutting operation it will be seen that the paddle wheel 8 will propel the barge and harvester as a whole forwardly during a cutting operation, said speed of advance being preferably five miles per hour, however, it will be seen that by varying the distance between the cutting disk and the free end of the conveyer 3 this speed may be increased if so desired. As the barges 17 are loaded they are removed to points where the material may be treated for use in various arts and manufactures.

The harvester is particularly adapted for use in shallow water in the inland waters of the southern States of the United States, therefore the range of the vertical movement of the cutting disks is not necessarily a great one when it is considered that the depth of the water in which the harvester is used is seldom greater than five feet, and by rotating the shaft 26ᵃ the slidable frame 23 may be lowered according to the depth of the water and the lower end of pivoted conveyer 3 simultaneously lowered to accommodate the disk cutters to various depth of water. When moving the harvester from place to place the shaft 26ᵃ is rotated so as to raise the cutters and the lower end of the conveyer 3 so that the same will not come in contact with obstructions.

From the above it will be seen that a harvester for aquatic plants is provided which harvester will sever the plant at a point below the water and the plants of their own buoyancy will rise to the surface of the water, where they will be gathered by the conveyer 3 and conveyed to the barge 17.

The invention having been set forth what is claimed as new and useful is:—

1. An aquatic plant harvester comprising a float, vertical guides carried at the forward end of said float, a vertically slidable cutter frame slidable in said guides, counterweights for balancing the cutter frame, cutters carried by said cutter frame, an inclined gathering conveyer having its upper end pivoted to frame work of the float, the free end of said inclined conveyer being disposed to the rear of the cutters and spaced therefrom, means connecting the cutter and conveyer for adjusting the cutter frame and the inclined gathering conveyer simultaneously, and means for propelling the float forwardly.

2. An aquatic plant harvester comprising a float, vertical guides carried at the forward end of said float, a vertically slidable cutter frame disposed in said guides, rotatable cutters carried by said slidable frame, an inclined conveyer pivoted in the frame work of the float, the lower end of said inclined conveyer being free, means connecting the cutter and conveyer whereby the free end of the inclined conveyer will be raised or lowered simultaneously with the raising or lowering of the cutters, means for securing the cutter frame in any position to which it may have been moved, a rearwardly extending conveyer carried by the float frame and adapted to receive the material from the inclined conveyer and discharge the same to the rear of the float, and means carried by the float for operating the conveyers.

3. An aquatic plant harvester comprising a float, downwardly extending guides carried by said float, a slidable cutter frame slidable in said guides, cutters carried by said cutter frame, an inclined gathering conveyer having its upper end pivoted to the frame of the float, the free end of said inclined conveyer being disposed to the rear of the cutters and spaced therefrom, means connecting the cutter and conveyer for adjusting the cutter frame and the inclined gathering conveyer simultaneously, and means for propelling the float forwardly.

4. An aquatic plant harvester comprising a float, a downwardly and upwardly adjustable cutter carried by said float an inclined gathering conveyer disposed behind said cutter and having its upper end pivoted in a bearing of the frame of the float, the lower end of said conveyer being free and disposed spaced from the cutter, and means connecting the cutter and conveyer whereby as the cutter is moved downwardly the free end of the conveyer will move downwardly and rearwardly.

5. An aquatic plant harvester comprising a float, a downwardly and upwardly adjustable cutter carried by said float, an inclined gathering conveyer disposed behind said cutter and having its upper end pivoted in the frame of the float, the lower end of said conveyer being free and disposed behind the cutter and means connecting the cutter and conveyer for moving the cutter upwardly and downwardly and simultaneously moving the free end of the conveyer closer or farther away from the cutter.

6. An aquatic plant harvester comprising a float, a downwardly and upwardly adjustable cutter carried by said float, a rearwardly and upwardly extending conveyer disposed to the rear of the cutter, the upper end of said conveyer being pivoted, means connecting the cutter and conveyer for simultaneously bringing the free end of the conveyer closer to the cutter when said cutter is raised and farther away from the cutter when said cutter is lowered, thereby providing means whereby the conveyer may be adjusted in relation to the depth of cut so as to allow the buoyancy of the material to raise said material to the surface before it is taken up by the conveyer.

In testimony whereof I have signed my name to this specification in the presence of two subscribing witnesses.

HARRY ELLWOOD ELLIS.

Witnesses:
T. G. FUTCH,
M. E. MILLER.